(12) United States Patent
Tsao

(10) Patent No.: US 6,961,045 B2
(45) Date of Patent: Nov. 1, 2005

(54) PATTERN PROJECTION TECHNIQUES FOR VOLUMETRIC 3D DISPLAYS AND 2D DISPLAYS

(76) Inventor: Che-Chih Tsao, 16 Walnut St., #43, Arlington, MA (US) 02476-6154

( * ) Notice: Subject to any disclaimer, the term of this patent is extended or adjusted under 35 U.S.C. 154(b) by 691 days.

(21) Appl. No.: 09/882,826

(22) Filed: Jun. 16, 2001

(65) Prior Publication Data

US 2002/0190922 A1 Dec. 19, 2002

(51) Int. Cl.[7] ............... G09G 3/36; G02F 1/1335; G03B 21/26
(52) U.S. Cl. ............... 345/103; 349/9; 353/34
(58) Field of Search ............ 345/87, 89, 103; 349/5, 8, 9; 359/10, 11; 353/31, 34

(56) References Cited

U.S. PATENT DOCUMENTS

| | | | | |
|---|---|---|---|---|
| 5,161,042 | A | | 11/1992 | Hamada ............... 359/41 |
| 5,506,597 | A | | 4/1996 | Thompson et al. ........ 345/85 |
| 5,566,007 | A | | 10/1996 | Ikeda et al. ............ 359/40 |
| 5,629,802 | A | * | 5/1997 | Clark .................. 359/573 |
| 5,754,147 | A | | 5/1998 | Tsao et al. ............. 345/6 |
| 5,764,319 | A | | 6/1998 | Nishihara .............. 349/8 |
| 5,777,588 | A | * | 7/1998 | Woodgate et al. ....... 345/6 |
| 5,954,414 | A | | 9/1999 | Tsao ................... 353/7 |
| 5,999,282 | A | | 12/1999 | Suzuki et al. ........... 359/20 |
| 6,064,423 | A | | 5/2000 | Geng ................... 348/37 |
| 6,097,352 | A | | 8/2000 | Zavracky et al. ........ 345/7 |
| 6,243,055 | B1 | | 6/2001 | Fergason ............... 345/32 |
| 6,304,703 | B1 | * | 10/2001 | Lowry ................. 385/120 |
| 6,342,960 | B1 | * | 1/2002 | McCullough ........... 398/79 |
| 6,457,831 | B1 | * | 10/2002 | Chuang et al. .......... 353/33 |
| 6,570,681 | B1 | * | 5/2003 | Favalora et al. ........ 359/17 |
| 6,609,796 | B2 | * | 8/2003 | Maki et al. ............ 353/31 |

OTHER PUBLICATIONS

Kim, S.G. and Hwang K.H., "Thin–Film Micromirror Array", Information Display 4&5/99, p. 30.
Morris, G.M. et al. "Diffractive Optics Technology for Projection Displays", SPIE Proceedings vol. 2650, p. 112.
Joubert, C. et al., "Dispersive Holographic Microlens Matrix for Single LCD Projection", SPIE Proceedings vol. 2650, p. 243.
Rosenbluth, A.E. and Singh, R.N., "Projection Optics for Reflective Light Valves", SPIE Proceedings vol. 3634, p. 87.
Displaytech Inc., of Longmont CO, product manual with title: Displaytech Displays p. 21–24.
Displaytech Inc., of Longmont CO, product manual with title: Integrated Circuit Spatial Light p. 3–6 Modulators— FLC.

* cited by examiner

Primary Examiner—Xiao Wu
Assistant Examiner—M. Fatahiyar

(57) ABSTRACT

This invention relates generally to image projection methods and apparatus for creating color or gray scale images using spatial light modulators (SLMs) without color or gray capability. The basic concept is to divide the pixels on a single SLM into multiple groups and then illuminate each group with a different primary color. The content of the single SLM panel can then be programmed as if there are multiple sub-panels illuminated with different primary colors. The combined image on the single panel therefore displays images of many colors. Illumination can be achieved by projection of a pattern of color or gray scale distribution to the surface of the SLM panel and registering the pattern to corresponding pixel groups; or can be implemented by applying a proximity pattern close to the SLM surface. This technique can be applied to volumetric 3D displays, 2D displays, and optical correlators.

26 Claims, 12 Drawing Sheets

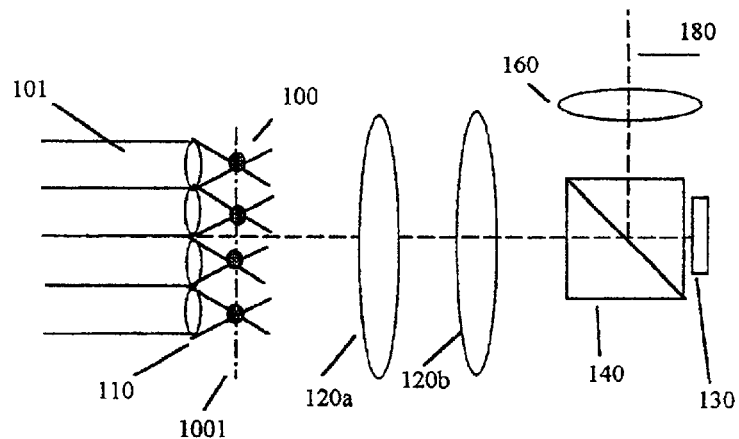
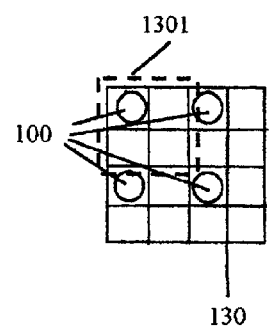
Fig. 1a
Fig. 1b
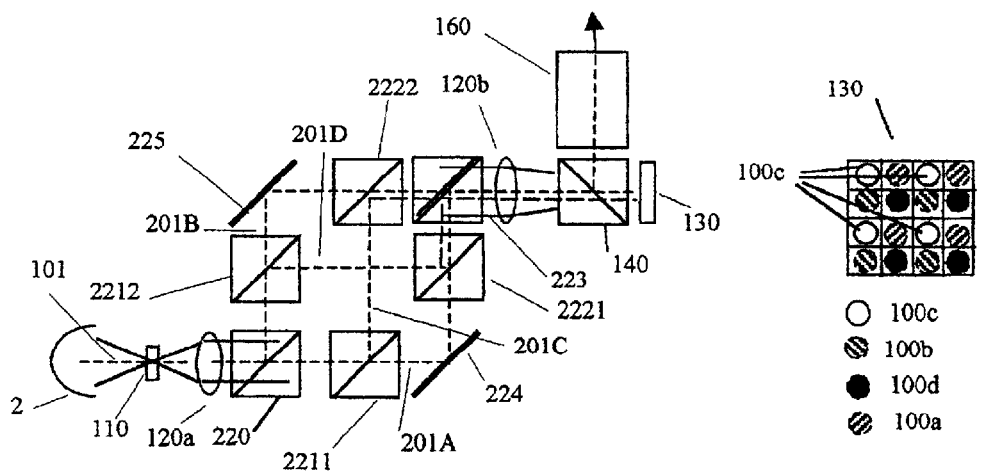
Fig. 2a
Fig. 2b

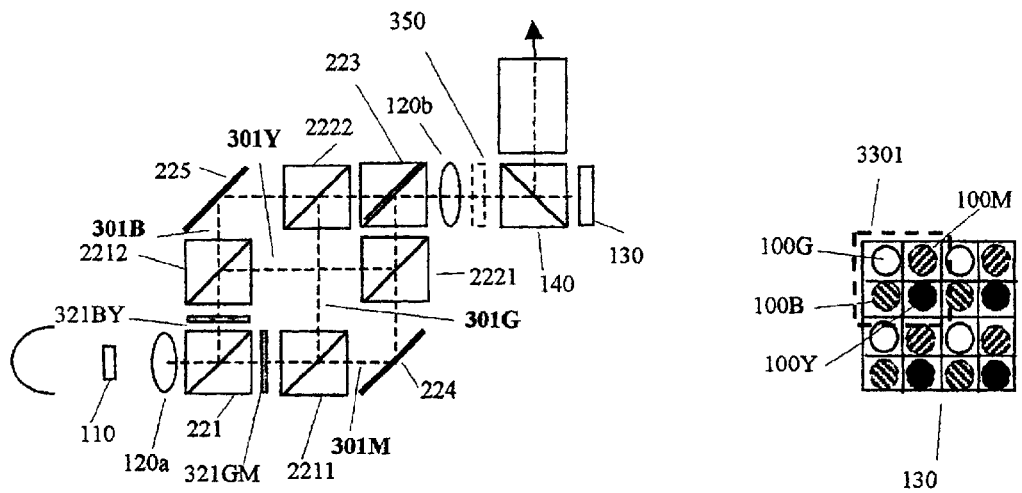
Fig. 3a
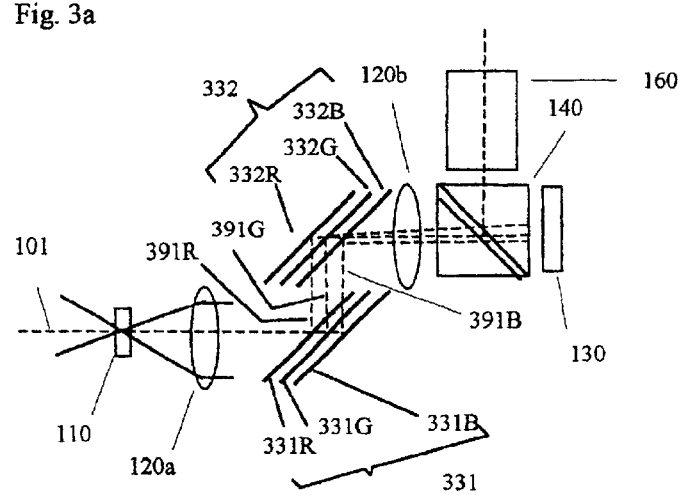
Fig. 3b
Fig. 3c
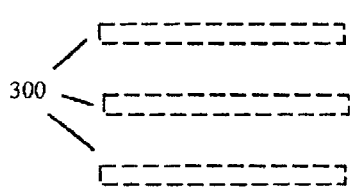
Fig. 3d
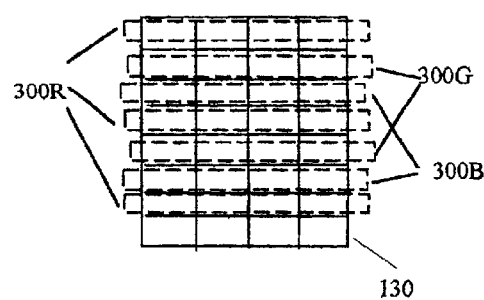
Fig. 3e

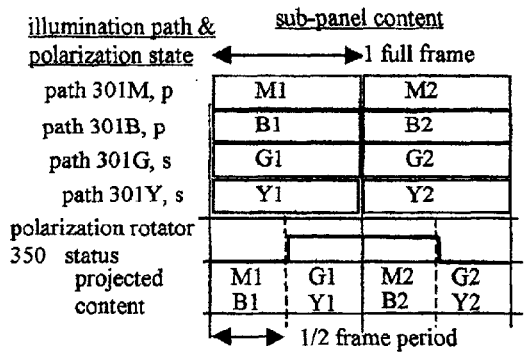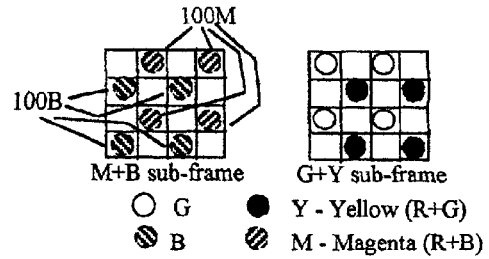
Fig. 3f          Fig. 3g
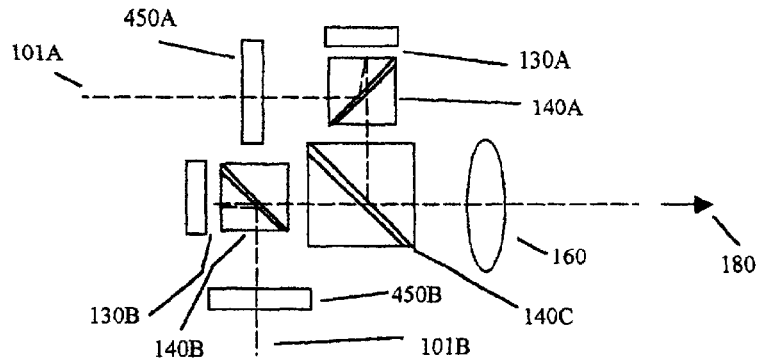
Fig. 4a
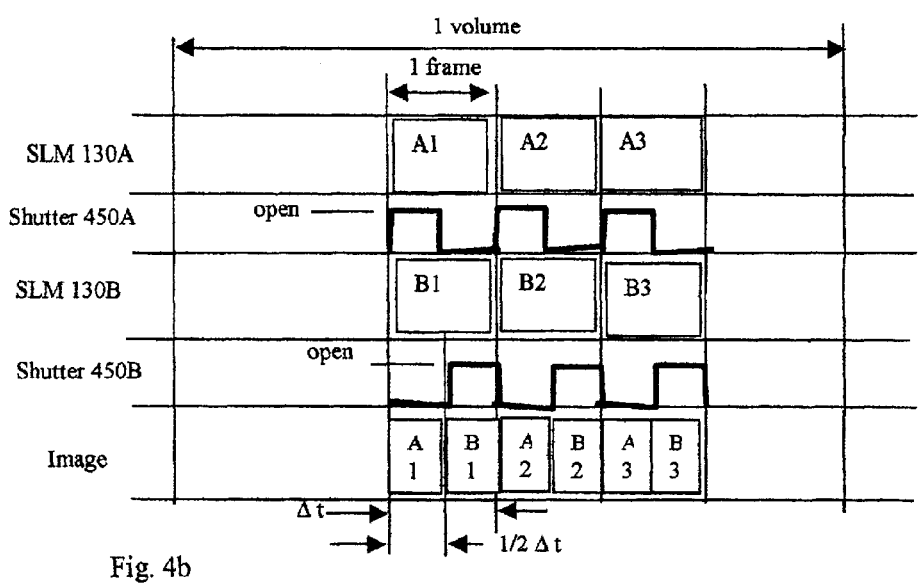
Fig. 4b

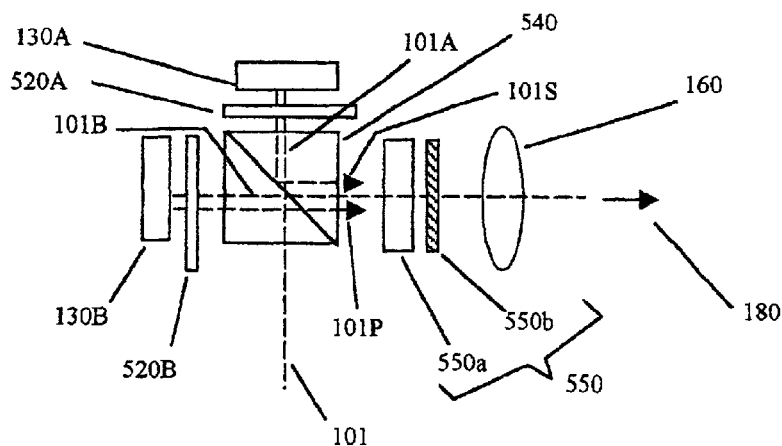
Fig. 5
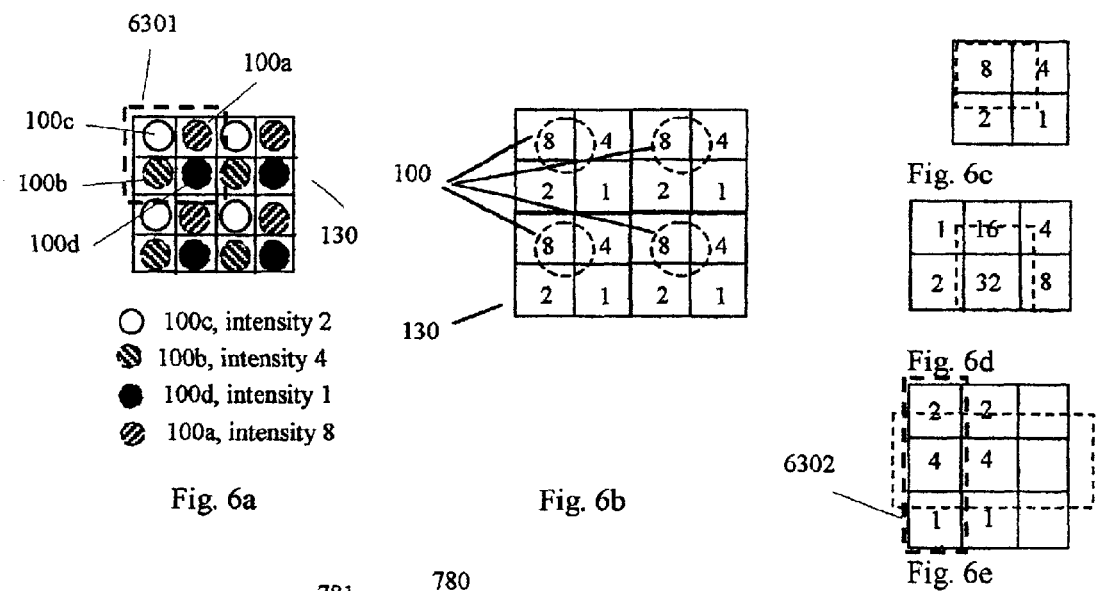
○ 100c, intensity 2
◈ 100b, intensity 4
● 100d, intensity 1
◉ 100a, intensity 8
Fig. 6a  Fig. 6b
Fig. 6c
Fig. 6d
Fig. 6e
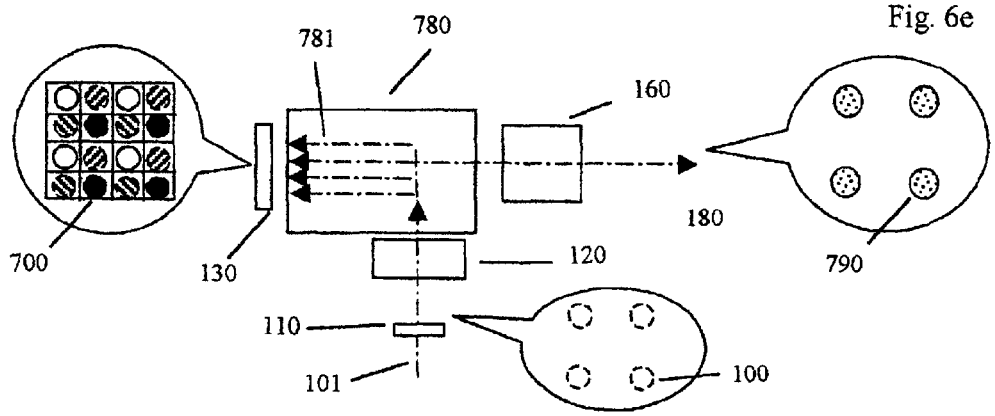
Fig. 7a

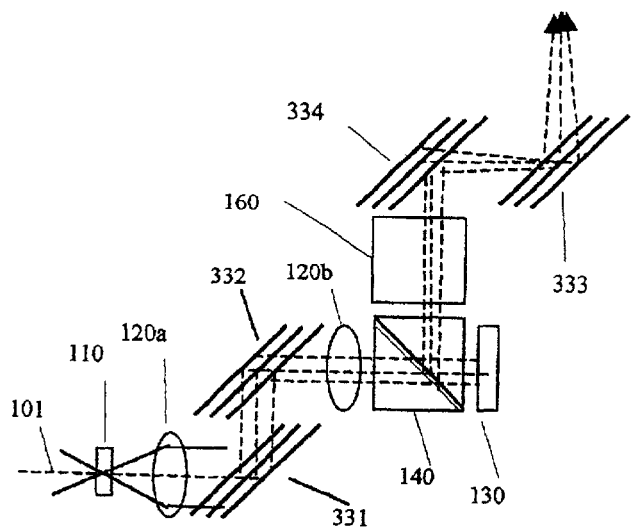
Fig. 8b
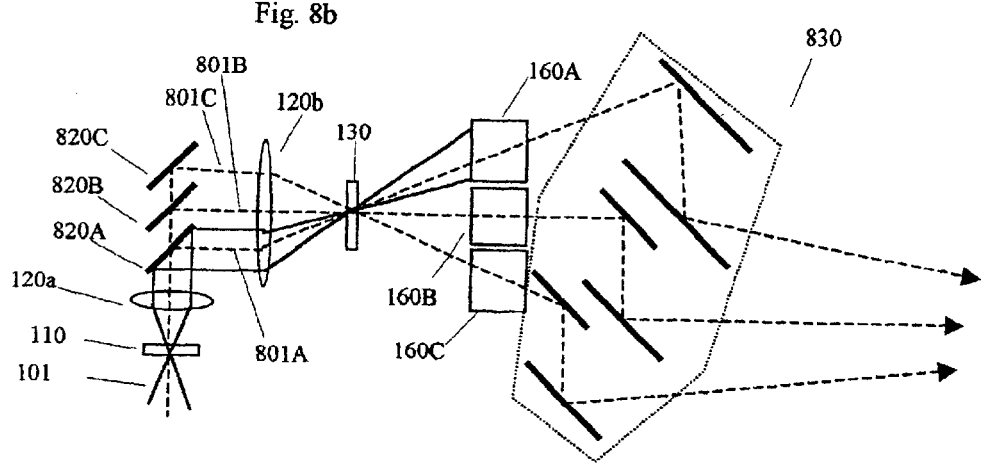
Fig. 8c
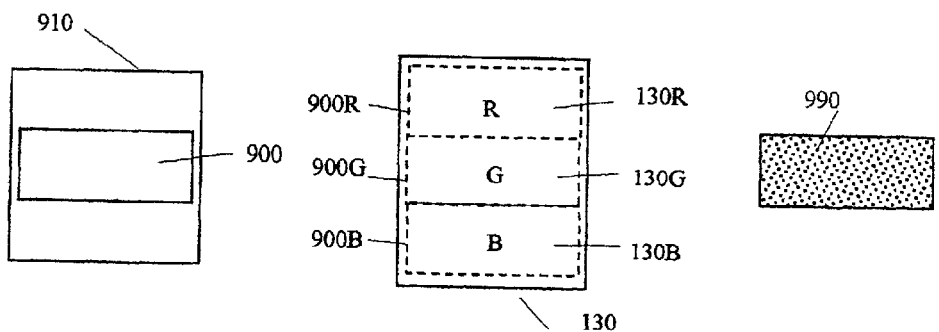
Fig. 9a
Fig. 9b
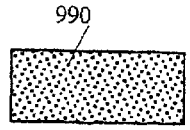
Fig. 9c

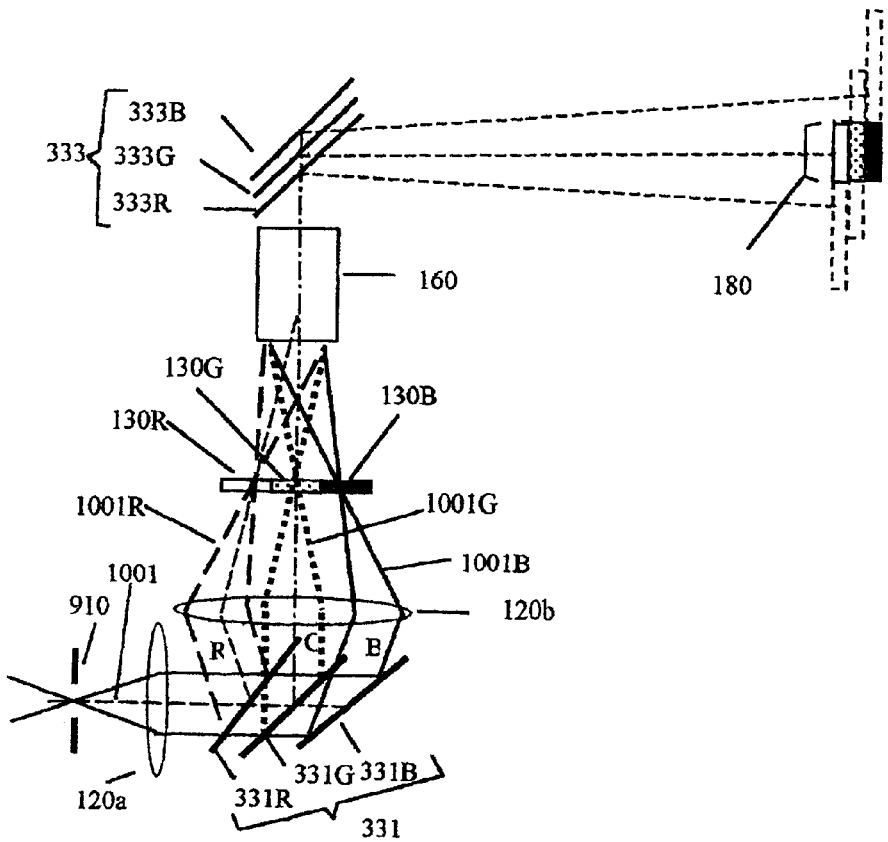
Fig. 10a
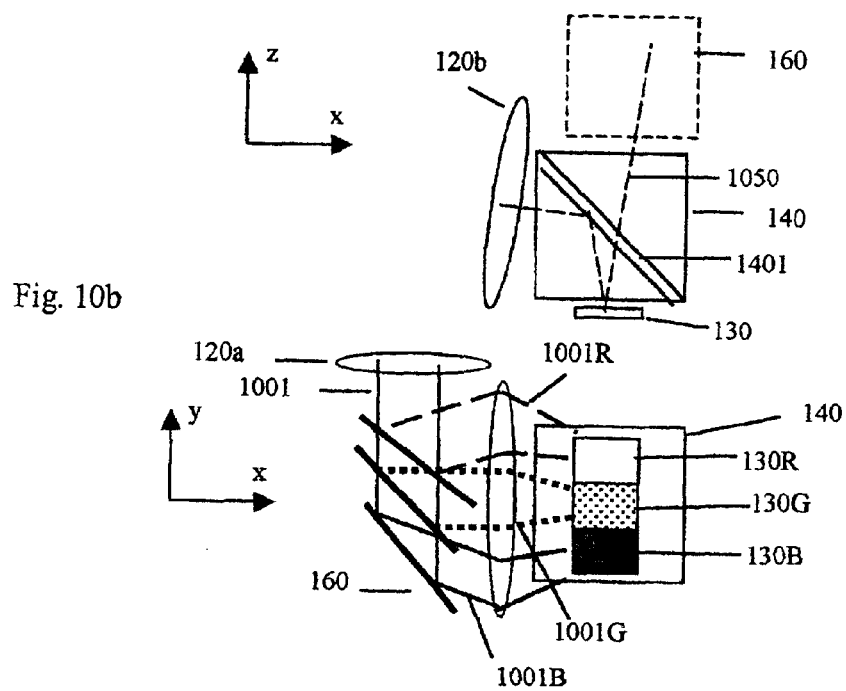
Fig. 10b
Fig. 10c

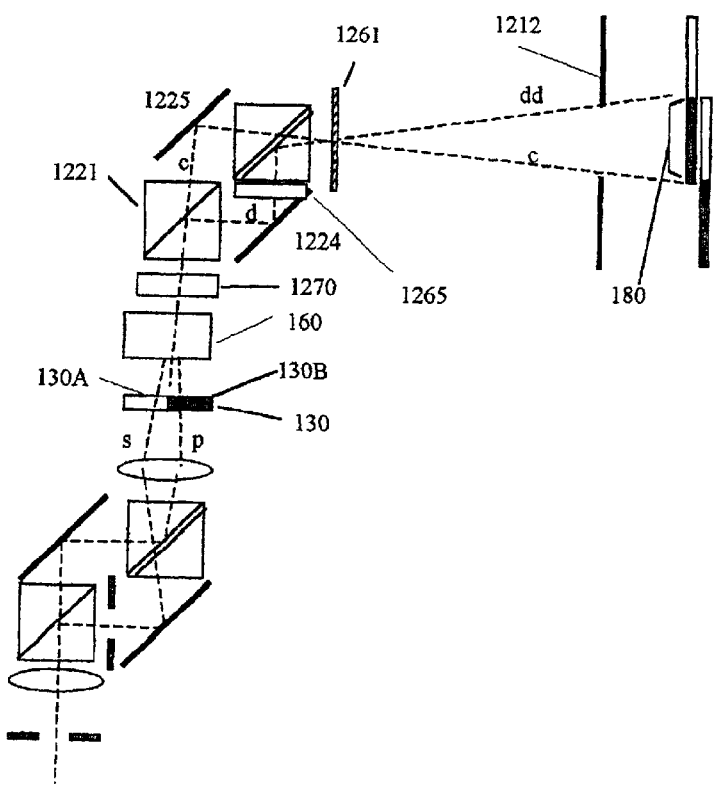
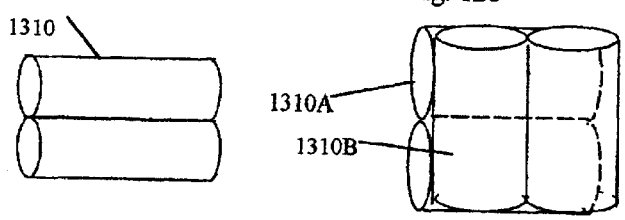
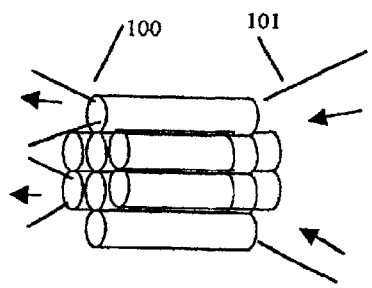
Fig. 12b
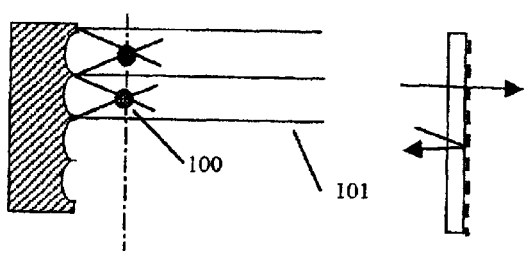
Fig. 13a   Fig. 13b   Fig. 13c
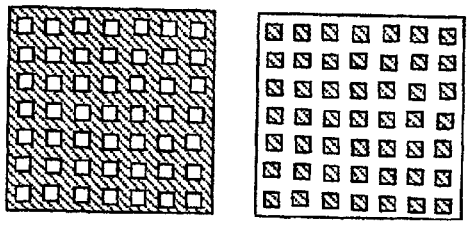
Fig. 13d   Fig. 13e   Fig. 13f   Fig. 13g

Fig. 16d-side

Fig. 16d-top

Fig. 16e-side

Fig. 16e-top

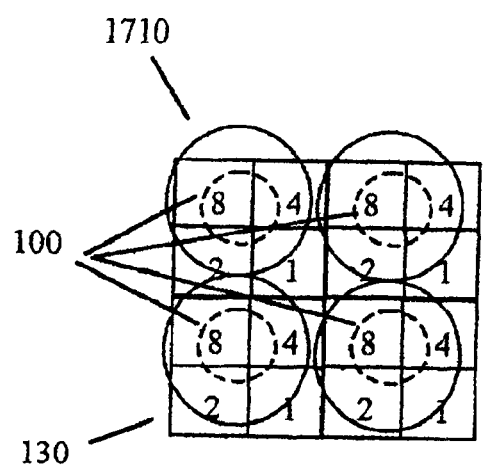
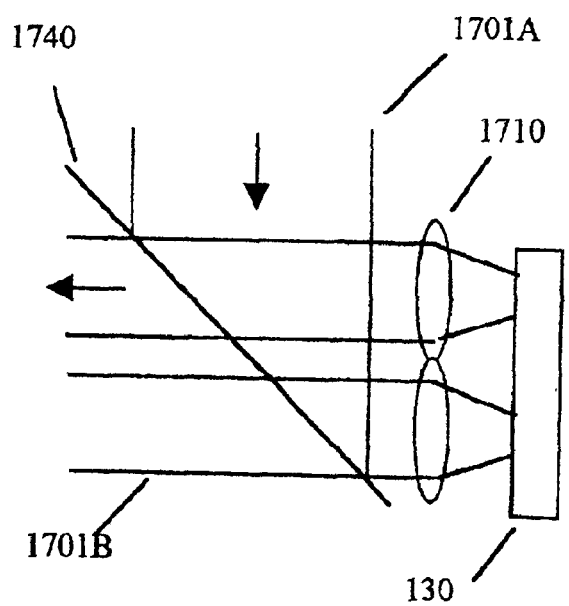
Fig. 17a  Fig. 17b
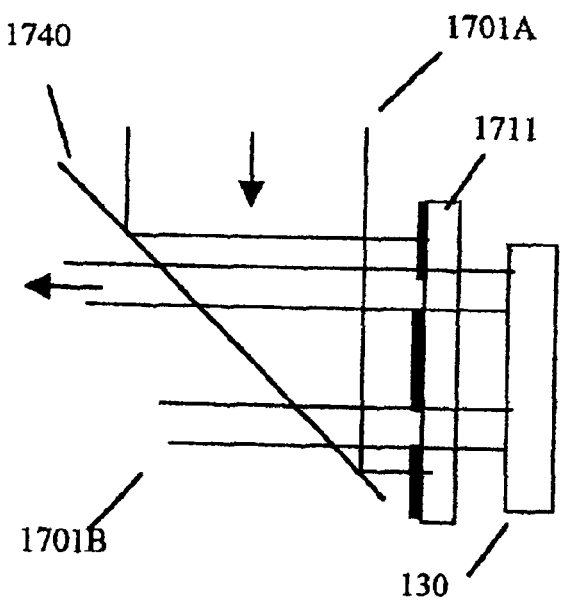
Fig. 17c

PATTERN PROJECTION TECHNIQUES FOR VOLUMETRIC 3D DISPLAYS AND 2D DISPLAYS

RELATED PATENTS AND APPLICATIONS

This invention is related to U.S. Pat. No. 5,754,147 issued May 19, 1998, U.S. Pat. No. 5,954,414 issued Sep. 21, 1999, U.S. patent application Ser. No. 09/218,938 filed Dec. 22, 1998, and U.S. patent application Ser. No. 09/253,656 filed Feb. 20, 1999.

BACKGROUND OF THE INVENTION

This invention relates generally to image projection methods and apparatus for creating color or gray scale images using spatial light modulators (SLMs) without color or gray capability. This technique can be especially useful for displaying color and gray scale images in volumetric 3D displays. A volumetric 3D display displays 3D images in a real 3D space. Each "voxel" in a volumetric image locates actually and physically at the spatial position where it is supposed to be, and light rays travel directly from that position toward omni-directions to form a real image in the eyes of viewers. As a result, a volumetric display possesses all major elements in both physiological and psychological depth cues and allows 360° walk-around viewing by multiple viewers without the need of special glasses. For examples, [Tsao et al. 1998] and [Tsao 1999] disclose principles of volumetric 3D displays based on an approach that, using an optical interfacing mechanism, smoothly delivers whole frames of 2D images, which are created on an SLM and projected from a non-moving projector, to a moving screen and displays them on the screen. The motion of the screen effectively distributes the 2D image frames displayed on the screen in a space. These spatially distributed image frames form a volumetric 3D image in the eyes of viewers due to the after image effect of human eye. In addition, this invention is also useful for 2D display applications, such as projection of 2D images and high frame rate image display for optical correlators.

Many SLMs do not have color or gray scale capability. For example, liquid crystal displays (LCD) generally use the orientation of the liquid crystal molecules in the pixel cells to modulate the amount of light transmitting through or reflected from the pixels. LCD devices are therefore only capable of binary images (black and white) or gray scale images, but not color images. To display colors using LCDs, the most common practice is to build a color filter mosaic over the pixel cells, which is sometimes called a color triad or color stripe structure. Color images can then be displayed using these colored pixel cells. Using color filter mosaic to create color triad structure has the shortcoming of low optical throughput since only about ⅓ of a white light passes any one of the color filters. Spatio-chromatic colored illumination techniques using diffractive optics or holographic elements have been developed to provide high optical throughput. For example, [Joubert] describes an arrangement using a grating system to separate R, G and B colors on a micro-scale and then using a micro-lens array to focus the R, G and B spots to different pixel locations. Equivalently, the function of the grating system and the micro-lens array can be integrated by using a holographic micro-lens array. Alternatively, a micro-lens array with built-in gratings can also be used for this function, as described in [Morris]. These techniques therefore can provide a color triad pattern with high optical throughput.

Alternatively, color images can be displayed by a combination of projections from several LCDs, each illuminated by a different color. For example, three LCDs, each illuminated by a light beam of red, green and blue color, can produce images of various color combinations by projection. For LCDs with high frame rate, such as display devices based on ferroelectric liquid crystals (called FLCD), a field sequential technique can be used to create color images using only one display device with no color triads [Displaytech].

In addition to LCDs, there are other devices that are capable of only binary images or gray scales images. For example, digital micro-mirror device (DMD) consists a matrix of actuated small reflectors. By striking the matrix with a light beam and switching the position of each reflector, arbitrary images can be generated on the device and can be projected [Thompson & Demond]. For another example, thin-film micro-mirror array (TMA) also consists of a matrix of piezo-actuated micro-mirrors and each mirror can be actuated at multiple positions to create gray scale [Kim & Huang]. And there are also many other micro-mirror based devices.

When used as the image source for volumetric 3D displays or for high speed optical correlators, the display device must have high frame rate. For volumetric 3D display, higher frame rate gives higher number of frames per image volume, hence higher resolution in the direction of screen sweep. For optical correlators, higher frame rate give higher processing (correlation) throughput. In these applications, display devices of binary image capability can give only limited color/gray capacity using conventional color forming practices. Particularly, field sequential technique is not suitable because each single frame has to have color/gray. Three display devices (R, G and B each) can be used to provide colors, but more display devices means higher cost. Color triad techniques can be applied, but fabricating color filter mosaic over display devices is costly, especially many high frame rate devices, such as FLCD and DMD, are reflective-type display and have fine pixels with pitch on the order of 10 micro-meters. The previously mentioned spatio-chromatic illumination techniques are also difficult to apply to these reflective type displays. The gratings and micro-lens (or equivalent holographic optical elements) used to create color patterns are generally attached or placed close to the back of a transmissive type LCD. Building the diffractive optics on the reflective SLM or attaching them to the SLMs are not very desirable.

When color triad techniques are applied to generate 2D color images, artifacts such as color aliasing such as Moire patterns can appear, because R, G and B sub-pixels are not perfectly mixed in space.

It is therefore the purpose of the current invention to provide methods and optical setups that allows the use of single binary SLM to create color and gray images without the need of color triad optics built-in on the display device. It is also the purpose of this invention to increase color/gray capacity of volumetric 3D displays that use, especially but not limited to, binary SLM. In addition, this invention can be applied to increase the resolution of volumetric 3D display systems in the screen motion direction. This invention can also be applied to 2D projectors, using a single display panel with color triad structure, to project images without color triad artifacts.

SUMMARY OF THE INVENTION

In general, the Pattern Projection technique illuminates an SLM with a light pattern comprising a 2D distribution of different values of a physical property of light. On the SLM, multiple pixels (or called sub-pixels) are grouped to represent one composite image pixel. The illumination of the light pattern over the SLM is arranged such that each sub-pixel of one image pixel is illuminated with a different value of the selected physical property of light, such as light intensity. By switching on or off selected sub-pixels, images with gray levels, for example, composed of selected sub-pixels of different light intensities, can be displayed. The illumination light pattern can be generated away from the SLM and then projected onto it. When the SLM is used as the image source in a projector, the illumination pattern also needs to serve as the light source of the projector. Illumination pattern can also be generated by using a proximity pattern plate close to the active surface of the SLM.

This technique can therefore define and separate a single SLM into multiple sub-panels and then use these panels as if using multiple display panels. For example, when the sub-panels are defined as closely interlocked regions and illuminated with different primary colors, the SLM can display images with many colors as if the pixels have a color triad structure. There is therefore no need of built-in color filter triads on the display device.

Images on different sub-panels on an SLM can also be separated in time domain into sub-frames to increase the effective frame rate of an SLM, by using a time-distributed illumination system to separate sub-panels carrying different light properties.

Illumination intensity over different sub-panels on an SLM can be scaled to proper ratio so that the composite image on the SLM can present more intensity levels (or gray levels) than non-scaled illumination. The scaled illumination can also be applied among adjacent pixels and sub-pixels on the SLM in a structural pattern to achieve similar results.

Multiple sub-panels on an SLM can be merged optically into a single sub-panel. This helps to eliminate image artifacts associated with displays with color triads.

Sub-panels on an SLM can also be defined as isolated and integrated regions.

There are many ways to generate the illumination pattern, including passing light through a micro-lens array, a shadow mask of reflective micro-pads, or an aperture plate with a transparent opening.

BRIEF DESCRIPTION OF THE DRAWINGS

FIGS. 1a&b shows the basic approach of generating an illumination pattern and defining a sub-panel by projecting the illumination pattern to an SLM.

FIGS. 2a&b shows an example optical setup for defining and illuminating multiple sub-panels on an SLM.

FIG. 3a shows a first color projector example.

FIG. 3b shows an example of resulted composite pixels and sub-pixels.

FIG. 3c shows a 2nd color projector example.

FIG. 3d shows an example of illumination pattern.

FIG. 3e shows resulted definition of sub-panels.

FIG. 3f shows the principle of separating images on different sub-panels in the time domain.

FIG. 3g shows resulted su-frames.

FIGS. 4a&b and FIG. 5 show the principle and example setups for merging image frames from different SLMs and distributing them in the time domain.

FIG. 6a-e shows the basic concept of "Scaled Illumination".

FIG. 7a and FIG. 8a show the approaches to merge images from different sub-panels into the format of one sub-panel. FIG. 7b & 7c show two examples of embodiment using the approach of FIG. 7a.

FIG. 8b & FIG. 8c show two examples of embodiment using the approach of FIG. 7a.

FIG. 9a-c shows sub-panels defined as isolated and separated regions on an SLM.

FIG. 10a-c shows the 3rd example color projector.

FIG. 12b shows the 6th example projector for displaying gray images.

FIG. 13a-g and FIG. 15 show additional approaches for generating the illumination pattern.

FIG. 16a–16g shows example embodiments for recycling light rays from the illumination lamp.

FIG. 17a-c shows the concept of using proximity pattern plates for scaled illumination.

DESCRIPTION OF THE INVENTION

Figure 7B:
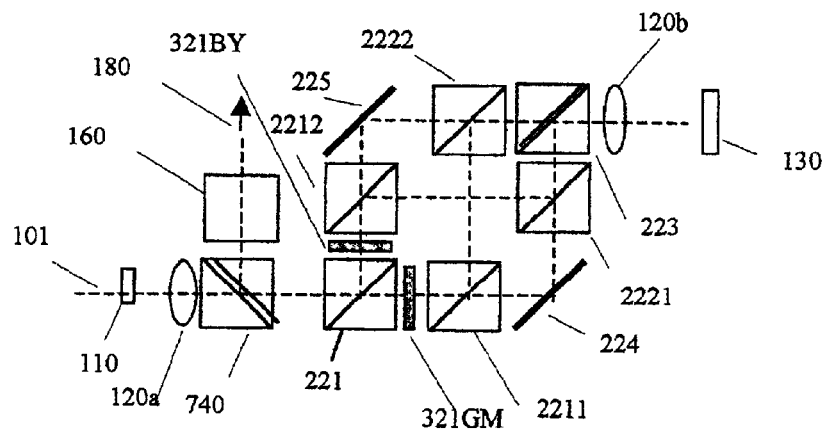

This invention relates generally to image projection methods and apparatus for creating color or gray scale images using spatial light modulators (SLMs) without color or gray capability.

The basic approach of Pattern Projection is to divide the pixels on a single SLM panel into multiple groups and then illuminate each group with a different primary color. The content of the single panel can then be programmed as if there are multiple "sub-panels" illuminated with different primary colors. The combined image on the panel therefore displays images of many colors.

From the view point of pixels, the Pattern Projection technique creates composite image pixels with color or gray levels by grouping multiple pixels (or called sub-pixels) to represent one composite pixel and illuminating each sub-pixel with a different color. or intensity. By switching on or off selected sub-pixels on one SLM panel, images with color levels, composed of selected sub-pixels of different colors and intensities, can be displayed.

In order to define and illuminate the multiple sub-panels in the way described above, a light pattern needs to be delivered onto the SLM panel. This illumination pattern provides a 2D distribution of different values of a physical property of light. This physical property is not limited to frequency (color). It can be light intensity (or amplitude), polarization, or phase. For example, when each sub-panel is illuminated with a same color, either at the same intensity or different intensity, the image of the whole panel appears to have many gray levels, of that color.

The definition and illumination of the multiple sub-panels (i.e. multiple groups of pixels) can be achieved by first generating a pattern of micro-light spots and then introduce this pattern of micro-light spots to the sub-panels by step-on projection. For example, the pattern of light spots can be generated using a micro-lens array. A micro-lens array is a matrix of micro-fabricated tiny lens. As illustrated in FIG. 1a, passing a light beam 101 through a 2D array of micro-lens 110 converts the light beam into a matrix of micro-light spots 100. The pattern of the light spots 100 is then used as the new light source and is projected using, for example, a pair of condenser lens 120a and 120b, onto the active area of an SLM panel 130. Depending on the packing geometry and the pitch of the micro-lens array and the magnification ratio of the condenser lens, the light spots can be aligned to cover only selected pixels on the display panel. As illustrated in FIG. 1b, for every four adjacent pixels 1301, only one is illuminated by the pattern of light spots 100. The illuminated pixels thus form one "sub-panel" on the display panel.

By using four patterns of light spots, four such sub-panels can be defined on a single display panel. In fact, a single micro-lens array is enough to create multiple patterns, by using suitable beam-splitting optics to separate the illumination paths. FIG. 2a illustrates an example of optical setup. By adding a set of beam splitting optics, such as a beamsplitter 220 and polarizing beamsplitter 2211 and 2212, between the two condenser-lens 120a and 120b, the light beam can be separated into four paths 201A–201D, each path carrying the same pattern of light spots. The four paths can be recombined, again using two polarizing cube beamsplitters 2221 and 2222 and one TIR (total internal reflection) prism 223, and projected onto the display panel. By adjusting the angles of mirrors 224 and 225 and TIR 223, the four paths can be slightly offset such that each pattern covers a different group of pixels. That is, the four paths define four sub-panels on the display panel. As illustrated in FIG. 2b, the sub-panel defined by light spots 100c has its illumination from path 201C. Similarly, sub-panels defined by light spots 100a, 100b and 100d have their illumination from paths 201A, 201B and 201D respectively.

By adding color filters into the separated illumination paths (201A–201D), different sub-panel can be illuminated by different primary colors and a color triad system can be formed on the display panel, without the need of mosaic of color filters. One embodiment example is illustrated in FIG. 3a. The differences between FIGS. 3a and 2a are that a polarizing beamsplitter 221 replaces the non-polarizing cube beamsplitter 220 and that two ColorSelect filters 321GM and 321BY are added into the layout. A ColorSelect filter takes a linearly polarized light and rotates the state of polarization of a primary color band by 90 degree, while the complementary color band retains the input state of polarization. For example, ColorSelect filter 321BY in FIG. 3a takes the input S-polarized light and rotates its blue (B) band into P-polarized, while the complimentary band (green+red= yellow, Y) is still S-polarized. As a result, the B band passes polarizing beamsplitter 2212 while the Y band reflects at polarizing beamsplitter 2211. ColorLink Inc. of Boulder, CO supplies this type of color filters. The two different ColorSelect filters 321 BY and 321GM separate the light beam into four paths, each with a different color, M (magenta, R+B), G (green), Y and B (301M, 301G, 301Y and 301B). (It should be noted that almost no light is wasted in this color separation layout.) When the four patterns of light spots with different colors illuminate their corresponding sub-panels, every four adjacent pixels on the SLM contain four colors: M, G, Y and B. That is, every four pixels form a composite pixel 3301 which has 4-bit colors, as combination of 4 sub-pixels illuminated with 4 different colors 100M, 100G, 100Y and 100B, as illustrated in FIG. 3b.

FIG. 3c illustrates another example optical setup for Pattern Projection using two sets of dichroic color filters, 331R-331B and 332R-332B, to separate a white light beam 101 into three paths 391R-391B, each path having a different color and illuminating a different sub-panel on the SLM. In the illustration, the illumination pattern contains an array of light stripes 300 (which can also be created by using micro-lens arrays, details described later), as shown in FIG. 3d. This set of stripes is separated into three sets, each set carrying a different color (R, G or B) and defining a different sub-panel, 300R-300B, as shown in FIG. 3e.

The multiple sub-panels on an SLM panel can also be separated into "sub-frames" to increase the effective frame rate. For volumetric 3D displays based on whole frame projection, increased effective frame rate means an increase of image resolution in the direction of screen motion. This can be achieved by illuminating each sub-panel at a different timing and for a time period shorter than the frame period of the original display device. For example, in the case of FIG. 3a, a polarization rotator 350 can be added. A polarization rotator takes a linearly polarized light and can switch the state of polarization by 90 or 0 degree, depending on an input voltage signal. That is, a p-polarized light can be rotated to become s-polarized and vise versa. The device can also be set to "no rotation". Then the state of polarization is kept invariant. Switching the polarization rotator effectively selects path 301B+301M (both p-polarized) or 301G+301Y (both s-polarized) to pass polarization beamsplitter 140 and reach the SLM. In other words, it selects sub-panels 100B and 100M (M+B) or 100G and 100Y (G+Y) to be illuminated. By changing the status of the polarization rotator in the mid of each frame, period, the images on sub-panels B+M and G+Y can be projected in sequence within the time period of one original frame, each for ½ the original frame duration, as illustrated in FIG. 3f. FIG. 3g illustrates how the two projected sub-frames look like. Sub-frame B+M contains images from sub-panels 100B and 100M. Sub-frame G+Y contains images from sub-panels 100G and 100Y. The effective frame rate is doubled, since each one full original frame is separated into two sub-frames.

For applications in volumetric 3D display, this sub-frame method is essentially a way of re-distributing pixels into the direction of screen motion to increase effective frame number in that direction. Accordingly, the total number of pixels in each sub-frame has to be reduced, to half of the original number in the case of FIG. 3g. However, it should be noted that the checkerboard-like pixel arrangement on each sub-frame as shown in FIG. 3g, although containing only half of the full-frame pixel number, still has the same position resolution as a full-frame, with a position error of one pixel.

Using multiple SLMs with a time-distributed illumination system can also increase effective frame rate. If one SLM can generate N different frames per second, then M devices can generate M*N frames per second simultaneously. FIG. 4a illustrates a preferred embodiment using two SLMs, 130A and 130B. Each SLM is illuminated by a light beam (101A or 101B) through a TIR prism (140A or 140B). A high-speed shutter (450A or 450 B) modulates the on/off of each illumination. The reflected image beams are combined through a third TIR prism 140C, and then projected through a projection lens 160 to a screen at 180 (not shown). FIG. 4b shows how to use the two shutters to place the two different image frames, each from a different SLM, into the timing period of a single frame. SLM 130A displays content A1 for a time period of Δt. During the same period, SLM 130B displays content B1. Shutter 450A opens for the first half of this time period, and then closes for the second half period. This action therefore projects content A1 only for the first half of the time period. Shutter 450B closes for the first half of this time period, and then opens for the second half period. This action thus projects content B1 only for the second half of the time period. As a result, during a time period Δt, two frames of different contents are displayed. The frame rate is therefore doubled. The open/close frequency of the high-speed shutter should at least be M times the maximum frame rate of the SLM, when M SLMs are used in the system. When more than 2 SLMs are used, more TIR prisms can be added to the system of FIG. 4a for image combination.

FIG. 5 illustrates another preferred embodiment for the multi-panel technique that provides a simpler arrangement than that of FIG. 4a. Instead of TIR prisms, a polarizing beamsplitter 540 is used to combine the images from the two SLMs. The polarizing beamsplitter also separates one input light beam 101 into two beams (101A & 101B) illuminating the two SLMs respectively. Because of the effect of the polarizing beamsplitter, the beam 101A directed at SLM 130A is P polarized, and the beam 101B directed at SLM 130B is S polarized. After reflections by the SLMs, the image beam from SLM 130A must contain S-polarized images in order to be reflected by the polarizing beamsplitter surface toward the projection lens 160, as indicated by 101S. On the other hand, the image beam from SLM 130B must be P-polarized in order to pass the polarizing beam splitter surface, as indicated by 101P. As a result, the polarization axis of the beam directed at the SLM must be rotated by 90 degree after reflection. When the SLMs are micro-mirror displays, such as DMD or TMA devices, the polarization of the reflected beam will be the same as the input beam. In such cases, quarter wave retarder plates 520A and 520B should be used so that the polarization axes of the beams reflected from the SLM can be rotated 90 degree (P turned in to S and S into P). When the SLMs are based on liquid crystal displays, such as FLC SLMs, this polarization rotation can generally be handled by the SLMs. In such cases, the quarter wave retarders are not needed. Because of the polarization difference between the two image beams (101S and 101P), a polarization selector 550, which comprises a polarization rotator 550a and a linear polarizer 550b, can be used to select either beam to pass on to the projection lens 160. This is equivalent to the function of the two shutters in FIG. 4a setup. The situation wherein beam 101S passing through the polarization selector is equivalent to the situation of shutter 450A open and 450B close. The situation wherein beam 101P passing through is equivalent to the situation of shutter 450A close and 450B open.

In the previous paragraphs, Pattern Projection technique is described by examples of color illumination over different sub-panels in order to project images of many colors. Illuminations of the same color (e.g. white) but with scaled intensity can be applied to different sub-panels to create images of many gray levels. For example, referring to the setup of FIG. 2a, the light intensity of each of the four separate paths (201A, 201B, 201C and 201D) can be scaled as 8: 4: 2: 1 by inserting aperture stops of proper openings into the four paths. As a result, the four sub-panels illuminated by the four paths also have the 8: 4: 2: 1 brightness scale, as illustrated in FIG. 6a. A composite pixel 6301 comprising four sub-pixels can therefore display a composite brightness of 16 gray levels (0–15) by the combination of the four sub-pixels, each of a different brightness. This method can be called "Scaled Illumination".

Besides scaling illumination intensity over different sub-panels, scaled illumination can also be applied to adjacent pixels on an SLM by a single light pattern. For example, as shown in FIG. 6b, each light spot 100 in an illumination pattern illuminates four adjacent sub-pixels at an off-set location such that the illumination intensity on each of the four adjacent pixels is scaled as 1: 2: 4: 8, as the numbers in each pixel indicate. Similarly, a rectangular illumination spot (which can be created by cross-stacking two arrays of micro-cylindrical lens) can also do this, as illustrated in FIG. 6c. If a pixel has 6 sub-pixels, it can have 64 gray levels, as shown in FIG. 6d. If the illumination pattern contains light stripes, each stripe can cover three rows of pixels and create an illumination scale of 1: 2: 4, as shown in FIG. 6e.

Figure 7C:
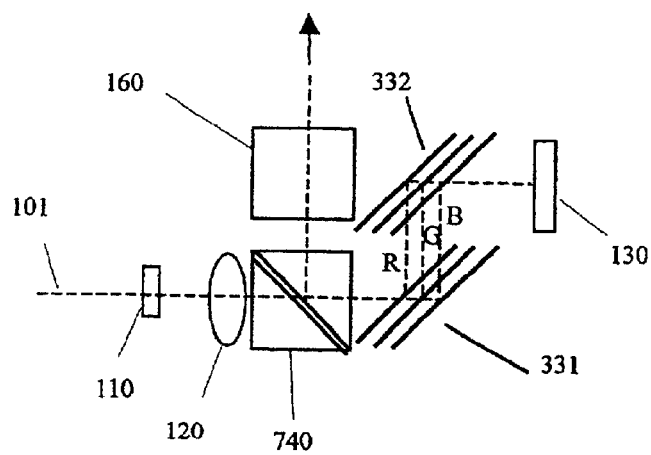

By methods described in previous paragraphs, the projected color images still contains the "look" of color triad structure, because each sub-panel on the SLM are physically separated by one or a few pixel pitches. This can result in undesirable artifacts in color images. Applying a projection and path-combination optical system, similar to the one that projects the light pattern onto the display panel, can merge the physically separated sub-panels and put R, G and B sub-pixels into one single pixel, that is, eliminating the look of color triads. The basic concept is illustrated in FIG. 7a. Since the path separation optics and combination optics are similar, only one set of separation/combination optical system 780 is needed if the SLM is of reflective types. Lens 120 projects the light pattern 100, which is generated by illuminating a pattern plate 110, onto the SLM 130 and projection lens 160 projects the image from the SLM onto the screen (not shown). The path separation/combination optics separates the illumination beam into multiple paths 781 leading to the display panel and partitions the display panel into four sub-panels 700. The same optics re-combines the images reflected from the four sub-panels and merges them into one single panel with each pixel comprising the superposition of four pixels each coming from a different sub-panel 790. FIG. 7b illustrates one example of this method. The path separation optics used in FIG. 3a are used as both path separation and combination optics. Lens 120a and 120b projects the light pattern on the pattern plate 110 onto the SLM 130, in four separated paths defining four sub-panels. Lens 120b and 160 act as projection lens and projects the re-combined images at a distance 180. The lens combination can be based on condenser lens or based on Schlieren optics. If desired, more than two components can be used in the lens combination and those components can be spread among the components of the separation/combination optics if necessary. A TIR prism 740 separates the illumination beam from the image beam. FIG. 7c illustrates another apparatus example using the path separation optics used in FIG. 3c. This setup uses two sets of 3 dichroic reflectors (331 and 332) to separate the light beam into R, G and B three paths. Each dichroic reflector reflects only a selected band of light (R, G or B) and passes the rest. Projection lens 120 projects the light pattern onto the SLM. The two sets of 3 dichroic reflectors are arranged as illustrated so that every path has the same length. (This is preferred when regular projection lens is used. If Schlieren projection optics are applied such that projection beams are collimated beams, then 3 dichroic mirror will be enough.) By adjusting the angle of each dichroic reflector, the three paths can be slightly offset to define three sub-panels. The image beams reflected from the SLM are re-combined and projected by projection lens 160. The three sub-panels are merged into one.

Figure 8A:
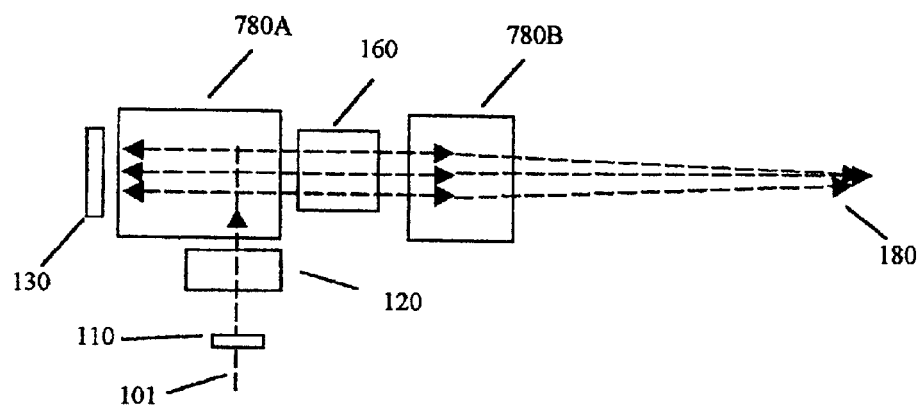

In the above description, the path/color separation and combination optics are placed between the SLM and the projection lens. This arrangement may require a large optical path length between the display panel and the projection lens. An alternative method is to place the separation optics 780A before the SLM (i.e. upstream in the light path) and use path/color merging optics 780A after the projection lens. FIG. 8a illustrates the general idea. In order to merge multiple sub-panels into one, each sub-panel must carry a different light property so that the merging optics can align the beam associated with each sub-panel independently. The merging of sub-panels can be based on their different colors (in the cases of making color projectors) or on their different polarization states (in the cases of projecting B&W or gray scale images).

For example, FIG. 8b illustrates an optical setup wherein the illumination arrangement (using two sets of dichroic color mirrors) is similar to that of FIG. 3c, while the projection arrangement also contains two sets of dichroic color mirrors 333 and 334. By adjusting inclination angle of each of the dichroic mirrors, separate sub-panels can be aligned into a single one.

When sub-panels are illuminated with light of non-differentiable properties, the merging of sub-panels can be done by spatially de-coupling optical paths passing different sub-panels, guiding each path to a different reflector respectively, and then merging them by adjusting the angle of each reflector. FIG. 8c illustrates an example of optical setup. For simplicity, the illustration uses transmissive type of display panel. For reflective types, the principle is the same. Three separate illumination beams (801A–C) illuminate the SLM that has three pre-defined sub-panels. The alignment of each beam to its corresponding sub-panel is achieved by adjusting reflectors 820A–C. The incidence angles of the beams to the SLM are selected such that once the beams leave the display panel at a distance, they no longer overlap one another. Three lens 160A–C are used to project the images on the display panel, with each projection lens receiving one beam from one sub-panel respectively. As a result, each projection lens can project images from only one sub-panel, not another two. The projection paths corresponding to each sub-panel are therefore also de-coupled spatially, no matter what color or polarization they carry. A system of reflectors 830 can therefore used to re-direct the projection paths and merge them at a distance.

Sub-panels on an SLM are defined as closely interlocked groups of different pixels so far, e.g. as shown in FIG. 2b. An alternative way to define sub-panels, as shown in FIG. 9b, is to separate the display panel into 3 completely separated and isolated regions (130R, 130G and 130B) and illuminate each region with an integrated and continuous rectangular beam of different color (900R, 900G and 900B). The illumination pattern can be generated by illuminating an aperture plate or a shadow mask 910 with a transparent opening 900, as shown in FIG. 9a. Combination optics then recombines the three sub-panels into one, as shown in FIG. 9c. The illumination optics and merging optics described previously still applies, except that the reflectors have to be offset at larger angles to align the illumination pattern to the sub-panels. Defining sub-panels as isolated and separate regions has at least two advantages. First, the aperture plate replaces the complex pattern plates. Second, the requirement on the illuminating optics for projecting a aperture image onto the display panel is less strict than those for projecting fine patterns and registering them to selected pixels on the display panel. The following preferred embodiments are therefore described based on isolated and separate sub-panels defined by aperture plates. But keep in mind that the following approaches also applies to closely interlocking sub-panels in principle.

FIG. 10a-10c illustrate a preferred color projector embodiment. The SLM is of the types that do not depend on polarization of illuminating light, such as DMD or TMA or the like. For simplicity, the optical layout in FIG. 10a is drawn as if the SLM is of the transmissive types. The principle for using reflective type SLM is the same. By setting the angle of each of the dichroic reflectors 331R-B, the image of the opening of the aperture plate 910 can be separately directed to three sub-panels 130R-B on the SLM, each carrying a different primary color. The SLM thus has three sub-panels each illuminated with a different primary color. Each of the dichroic reflectors after the projection lens 333R-B reflects a beam from one and only one sub-panel with a corresponding primary color. By properly setting the reflector angle, the images of the three sub-panels can be merged on a projection screen at a distance 180. A color image can therefore be projected.

For best result, the illumination of the three isolated sub-panels should also minimize unnecessary loss of light. This can be achieved by matching the illumination paths to the imaging path of the projection lens. As shown in FIG. 10a, the light from the source aperture plate 910 is first collimated by the first condenser lens 120a. The collimated beam is then separated into three illumination beams 1001R-B, each carrying a primary color, using a set of dichroic color mirrors 331. The angle of each illumination beam is selected in a way such that after passing the 2nd condenser lens 120b the cone of light of each illumination beam passes the its corresponding sub-panel and reach the entrance pupil of the projection lens 160. As a result, each illumination beam illuminates its corresponding sub-panel only and most light from the lamp is collected at the projection lens.

For reflective type display devices, such as FLCD, DMD and TMA, one can use a TIR prism or a polarizing beam-splitter 140 to fold the projection beam, as illustrated in FIG. 10b. In these cases, a preferred arrangement is to do illumination beams separation and projection beam folding on different planes. As illustrated FIG. 10b, the folding of the projection beam 1050 is on the x-z plane. FIG. 10c, which is the top-view of FIG. 10b, illustrates that the separation of illumination beam is done in x-y plane. As a result, all three illumination beams 1001R-B enters the TIR prism and hit the TIR surface 1401 at the same angle as viewed on x-z plane. The angular difference of these illumination beams as viewed on x-y plane therefore has minimum effect on the performance of the TIR prism or the polarizing beamsplitter.

When micro-mirror type SLMs, such as DMD and TMA, are used, it is preferred to align the display panel so that the tilting plane of the micro-mirrors is not on the same plane as the plane of illumination beams separation (i.e. not on x-y plane in terms of FIG. 10c). This is also to minimize the effect of the angular difference among the separated illumination beams on the performance of those display devices, since they basically use the tilting angle of micro-mirror to control the reflective intensity of a pixel.

Figure 11:
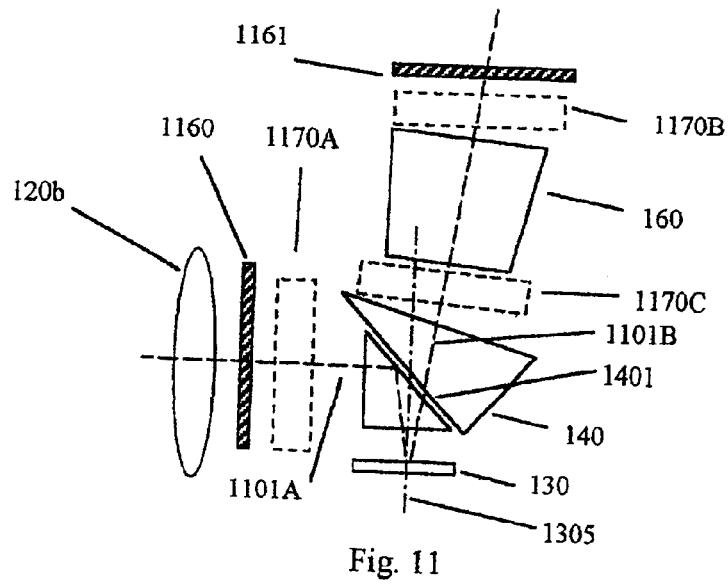
FIG. 11 shows the 4th example projector using FLC SLM.

When a FLC SLM is used as the image source, it is required that the electric charge applied over the electrodes of each FLC cell be balanced by displaying an inverted frame corresponding to each positive (non-inverted) frames to be projected. In an inverted frame, the polarization axis of the light carrying the image is perpendicular to the polarization axis of the image light on a positive frame. In order to project both positive and inverted frames and be able to see them as all-positive images, a polarization rotator can be used to switch the polarization axis of each inverted frame and thus convert it into a positive frame. However, because the FLC SLM is a reflective type display, which requires the illumination beam and the reflected beam share a lot of common space in front of the panel, the polarization switching arrangement is compounded by the projection optics arrangement. The basic solution is a combination of off-axis projection principle with the use of TIR (total internal reflection) prisms. A preferred setup is shown in FIG. 11. The TIR prism 140 allows a tight folding of the illumination beam 1101A and the reflected beam 1101B so that optics on the illumination end and on the reflection end can fit in without interference. This is called off-axis projection because the projection beam 1101B is off an axis normal to the surface of the FLC SLM 1305. The basic requirement on the TIR setup is that the illumination beam and the reflection beam must intersect the TIR surface 1401 at two slightly different angles, one corresponds to total internal reflection and one corresponds to transmission. A linear polarizer 1160 polarizes all illumination light before the light reaching the SLM 130. The polarization rotator can be placed at 1170A or 1170B or 1170C and operate according to the status of image frame on the SLM. A clean up polarizer 1161 can be placed after the projection lens 160 to make sure all projected frames are in the preferred polarization.

Usually, on a FLC SLM, an inverted image frame is displayed immediately after one positive (non-inverted) frame is displayed in order to balance the electric charge applied to the FLC cells. Correspondingly, the switchable polarization rotator must change states at each frame. Since the FLC has a finite response time, there is a short transition period when the SLM inverts its image. During this transition period, the image has poor contrast. As frame rate increases, the effect of this transition period can appear. Also, this method of charge balance reduces effective frame rate, since every two successive frames look the same after the polarization rotator. Instead of the above "frame-by-frame" balance, a preferred method to balance charge is "stack-by-stack" balance, which displays a number of all-positive frames successively and then displays their inverted frames successively. The switchable polarization rotator changes states from stack to stack. This display method improves contrast at high frame rate.

Figure 12A:
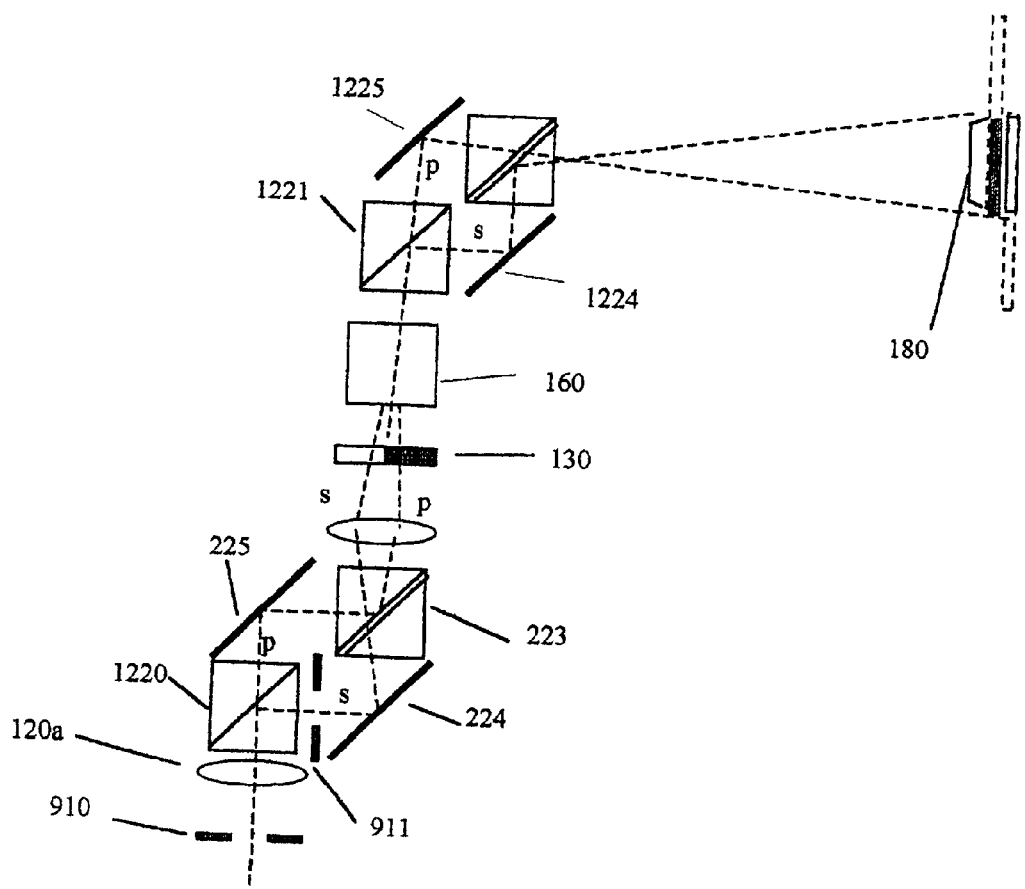
FIG. 12a shows the 5th example projector for displaying gray images.

FIG. 12a illustrates a preferred gray scale projector embodiment. The SLM is of the types that do not depend on polarization of illuminating light, such as DMD or TMA or the like. Again, the drawing assumes the SLM as transmissive type for convenience of explanation. The polarization beamsplitter 1220, TIR prism 223 and two reflectors 224 and 225 separate the illumination beam into two paths. The display panel 130 is therefore defined with two sub-panels, each illuminated with light of a different polarization (P or S). After the projection lens, a similar optical setup merges the two sub-panels on a projection screen at a distance. A second aperture plate 911 is inserted into one of the two paths to create scaled illumination to the two sub-panels. For example, if on each sub-panel one pixel contains four sub-pixels of equal size, then the gray level of one pixel is 5 (0–4). If the illumination intensity over the two sub-panels are scaled as 1:5, then the combined gray level is 25 (5×5).

FIG. 12b illustrates still another preferred embodiment of gray scale projector. The display panel is the type based on polarization, such as a FLC SLM. The setup is basically similar to that of FIG. 12a, except for a few additional components. Polarization difference is used for separation of illumination paths and for merging of the two sub-panels. However, because the display image is also based on difference of polarization, some special treatments with use of additional components are needed. First, the images on the two sub-panels are defined to always have different polarization states. That is, when sub-panel 130A displays images of P state and background of S state, then sub-panel 130B displays images of S state and background of P state. In this way, the images from the two sub-panels can be separated by the polarizing beamsplitter 1221 into two paths and then merged together at a distance 180. A ½-wave plate 1265 is therefore needed to turn the polarization axis of one of the two images 90 degree, so that both images are projected with the same polarization state. A screen aperture 1212 is also needed to block unwanted half images from reaching the screen. Again, the polarization rotator 1270 is used for projecting inverted image frames.

The method of combining and merging images from a display panel of color triad type structure described above applies not only to color triads or sub-panels structure created by Pattern Projection techniques, but also to any display panel with built-in color triads or build-in separate and isolated sub-panels. When sub-panels are defined as separate and isolated regions on an SLM, one can even illuminate all sub-panels with a white light and then use dichroic color mirrors to filter out desired color from each sub-panels and then merge them into one image. The disadvantage of this method is that it throws away ⅔ light. Similarly, in a gray scale projector such as the one depicted in FIG. 12a, the SLM can also be illuminated with non-polarized light. The merging optics after the projection lens 160 can still filter out the desired sub-panel images and merge them into one image, with ½ light being thrown away.

In addition to using arrays of micro-lens, there are many other ways of creating a pattern of light spots or stripes. Depending on how the light is manipulated, there can be three broad categories of ways:

(1) Using an array of light re-directing elements: A light re-directing element changes the direction of light to form the desired light pattern. One example is spherical micro-lens, which can be used to create arrays of circular spots, as already described in FIG. 1a Another example is micro-cylindrical lens, as illustrated in FIG. 13a, which can generate arrays of stripes, as illustrated in FIG. 3d. Stacking two arrays of micro-cylindrical lens in orthogonal directions, as illustrated in FIG. 13b, can generate square light spots as the ones depicted in FIGS. 6b & c. Another example is an optical fiber bundle, wherein each optical fiber can represent a light spot when the opposite end is illuminated, as illustrated in FIG. 13c. An array of concave reflective surface can also create an array of light spots or stripes, as illustrated in FIG. 13d.

Figure 14:
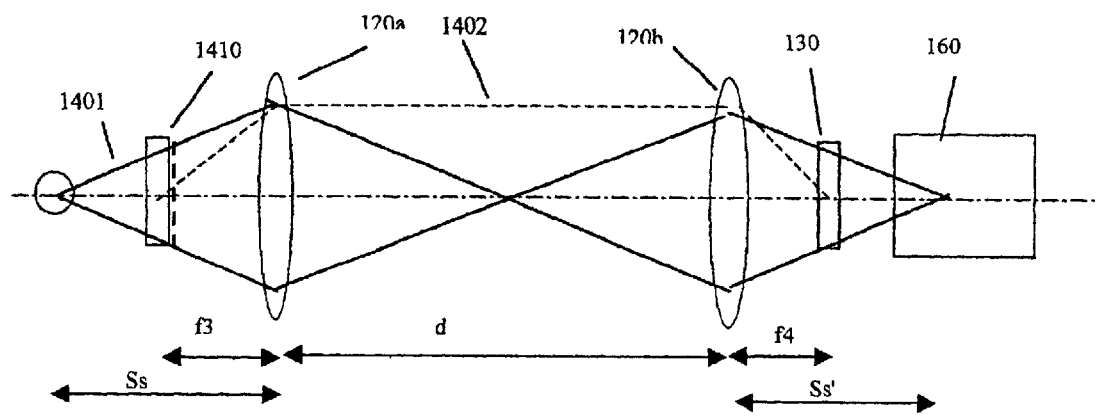
FIG. 14 shows an example of optical layout when using a shadow mask to generate the illumination pattern.

(2) Using an array of light masking element: As illustrated in FIG. 13e-g, the shadow mask can be in the form of a coating of reflective patterns (mask) over a transparent glass. A shadow mask can be a positive (i.e. light spots are unmask areas and the rest areas are masked) (FIG. 13f) or a negative (i.e. light spots are the areas coated with reflective coatings) (FIG. 13g). In the drawings, the hatched area indicates reflective coating. The use of shadow mask as pattern plate de-couples the imaging optical path and the illumination optical path. FIG. 14 shows the use of a pair of condenser lens as imaging lens. Optics such as path separating/recombining prisms can be placed in the space d. If Ss=2f3, then d can be set to 2(f3+f4), giving Ss'=2f4. If Ss<2f3, then d can be >2(f3+f4). If Ss>2f3, then d<2(f3+f4).

(3) Using an array of light filtering elements: Depending on different purposes, filtering elements for different light properties can be applied. For example, a mosaic of micro-color filters can create a pattern of colors. A mosaic of micro-polarization filters can create a pattern of polarization difference. A film of pattern of intensity difference can generate light spots or stripe of different brightness. To create a pattern of phase difference; one can use a glass plate with cells of different thickness or different index of refraction, or use a mosaic of cells containing liquid crystals of different orientations, wherein different liquid crystals orientations results in different phase attenuation of the illumination light.

Figure 15:
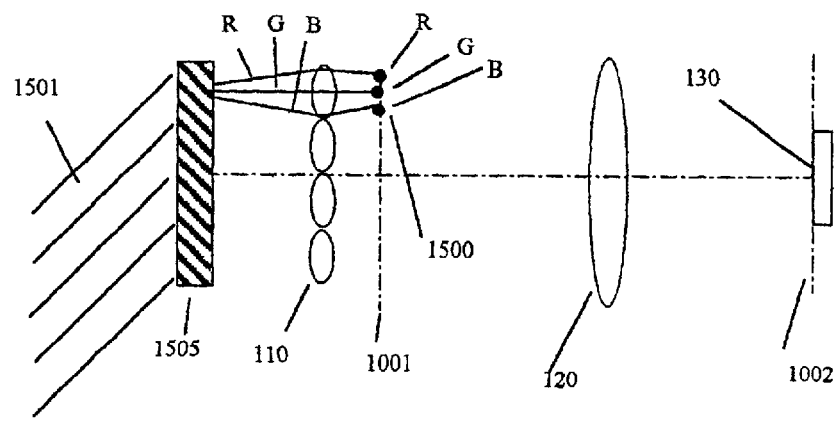

There can be other ways of generating a color light pattern. FIG. 15 illustrates an example applying a diffractive grating with a microlens array to generate a color pattern, and projecting the color pattern onto the SLM. First, an array of light stripes is created by passing a light beam 1501 through a diffractive grating 1505 and then an array of cylindrical micro-lenses 110. The array of light stripes 1500 forms near the focal plane 1001 of the micro-lenses, with an alternating color sequence of R, G, and B. The image of the light stripes near plane 1001 is then projected, using an imaging lens 120, onto the active area of the SLM 130. Besides cylindrical micro-lens, a 2D array of spherical micro-lens can also be used. The micro-lens can also be spherical and be hex packed to generate non-stripe types of RGB pattern. The gratings and micro-lens array can of course be replaced by an integrated holographic optical element. [Joubert] discloses the above methods of creating RGB patterns.

Figure 16A:
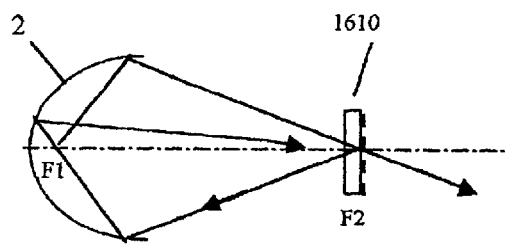
Figure 16B:
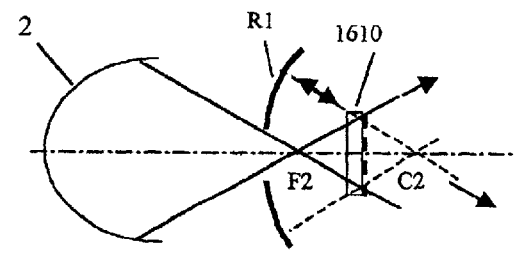
Figure 16C:
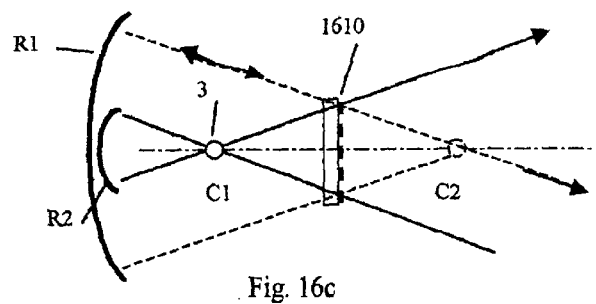
Figure 16F:
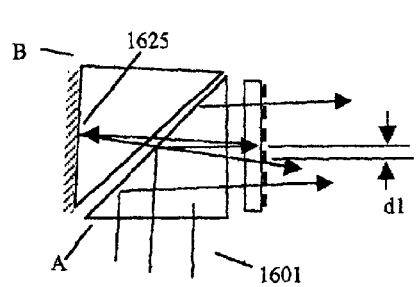
Figure 16F:
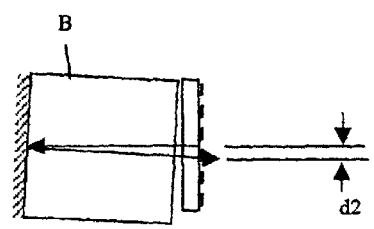
Figure 16F:
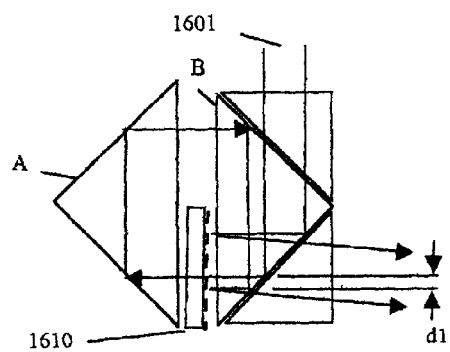
Figure 16F:
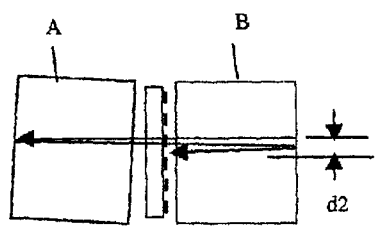
Figure 16F:
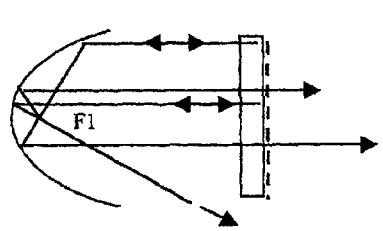
Figure 16G:
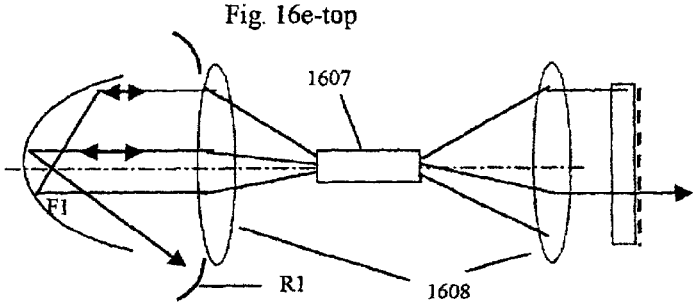

When a shadow mask is used to create the light pattern, especially when the shadow mask contains micro-reflective patterns, a major problem is the need to recycle the light rays that are masked out to increase light efficiency. There are many ways to recycle the masked light. FIG. 16*a* shows one example for recycling converging light rays from a lamp with elliptical reflector 2. Placing the shadow mask (positive) 1610 at the focal point F2 can recycle a significant amount of reflected rays. FIG. 16*b* shows another example for recycling diverging light rays from a lamp with elliptical reflector. A spherical mirror R1 is used to collect rays reflected from the shadow mask. C2 is the mirror image of F2 as imaged by the reflector of the shadow mask. The center of curvature of R1 is placed close to C2, so that all rays reflected by the shadow mask are collected and returned to the shadow mask. A center hole on R1 is needed to allow the rays from the lamp to reach F2. FIG. 16*c* shows an example for recycling diverging light rays from a lamp with no built-in reflector. A spherical reflector R2 is therefore necessary to collect and return rays from the lamp at C1. A spherical mirror R1 is again used to collect rays reflected from the shadow mask. C2 is the mirror image of C1 as imaged by the reflector of the shadow mask and the center of curvature of R1 is placed close to C2. FIG. 16*d* shows an example for recycling parallel light rays, when a positive shadow mask is used. The basic concept is using prisms or reflectors to recycle light rays. As illustrated in FIG. 15*d*-side, input rays 1601 are slightly inclined so that rays reflected by the shadow mask can enter prism B. Prism B is also inclined w.r.t. the shadow mask so that its reflective coating on one face 1625 can send rays back to the shadow mask. The inclination angles can be selected such that the rays reflected at the shadow mask can be sent back to the shadow mask with a desired position deviation of d1, e.g. N*½ pitch of the spot pattern on the shadow mask, thereby the rays can pass the mask. FIG. 16*d*-top is the top view of the figure on the left. Prism B is slightly rotated to give a reflected deviation d2 in the horizontal direction, for similar reasons as d1. FIG. 16*e* shows another example for recycling parallel light rays, when a negative shadow mask is used. In this setup, a set of right angle prisms is used. FIG. 16*e*-side shows the side view. Prism A has a size slightly different from that of prism B so that the recycled ray can be brought to a different location on the shadow mask. The shadow mask is slightly tilted w.r.t. the edges of the right angle prisms so that the reflected rays can leave prism B. Two mirrors can also replace prism A to achieve similar function. The size of prism A can be selected such that the recycled rays can be brought back to the front of the mask with a desired position deviation of d1. A d1 value of N*½ pitch of the spot pattern on the mask can make the rays be reflected by the mask. FIG. 16*e*-top is the top view of the figure on the left. Prism A is slightly rotated to give a reflected deviation d2 in the horizontal direction, for similar reasons as d1. FIG. 16*f* shows optics for recycling parallel light rays from a lamp with a parabolic reflector. The basic concept is using the parabolic reflector to recycle the light rays directly. FIG. 16*g* shows another example for recycling parallel light rays from a lamp with a parabolic reflector. It uses an integrator 1607 with two lens 1608 can make the parallel beam reaching the shadow mask more uniform. The spherical mirror R1, centered at F1, recycles rays being reflected back to the parabolic lamp reflector around the optical axis (center region). More discussions and methods of lamp light rays recycling methods can be found in [Rosenbluth and R. N. Singh].

Although the above description has been focused on creating an illumination pattern using one pattern plate (such a micro-lens array, a shadow mask or an aperture plate), more than one pattern plate can be used to create illumination pattern containing more than one geometric arrangements of light spots or stripes. More than one light property can also be included in a illumination pattern. For example, an SLM can have four sub-panels, three of them being illuminated with R G B primary colors and one illuminated with white light.

Besides step-on projection of an illumination pattern, another way to illuminate an SLM with a light pattern is to use a proximity pattern plate and illuminate the plate with a white light. FIGS. 17*a* & *b* illustrates one example using a micro-lens array as the proximity pattern plate. The micro-lens array 1710 is arranged in a way that when illuminated with an input beam 1701A a light spot forms corresponding to each micro-lens and covers four adjacent pixels at an offset location. The depicted SLM 130 is of reflective type. By using a polarizing beam splitter 1740 or a TIR prism, the input beam 1701A can be separated from the reflected image beam 1701B. In general, the active surface of the SLM can be placed near the focal plane of the micro-lens array. Because of the presence of the micro-lens array, the reflected image from the SLM appears comprising of composite pixels each covering four pixels and having the light intensity of 16 levels. Similarly, a shadow mask containing micro-openings can also be used in proximity to the SLM to create scaled illumination over adjacent pixels, as shown in FIG. 17*c*.

Although the above description has been focused on spatial light modulators with no gray scale capacity, the techniques described above can also be applied to SLMs with gray capacity, such as TMA or some types of FLC SLM, or even with color capacity. The principle of pattern generation and illumination is still the same, yet more color or gray levels can be generated since each pixel itself now has more gray or color levels.

The techniques described above can also be applied to a display system using more than one SLMs. In such cases, images from each SLM can be merged and displayed. For example, using a dichroic color cube, a white light illumination pattern can be separated into RGB three primary colors each illuminating one SLM, and images from the three SLMs can also be merged. For another example, an optical setup similar to that of FIG. 10*a* can also be used, with 130R-130B each representing an SLM. With multiple SLMs, sub-panels from different SLMs can be optically overlapped and displayed when desired.

The methods and optical setups described above allows the use of single binary SLM to create color and gray images without the need of color triad optics built-in on the display device. Although examples in this invention have mostly been described in the form of projectors, the techniques disclosed above are not limited to projectors. For example, the images on SLMs can also be viewed directly, with or without the help of a 45-degree half-silvered mirror or the like and with or without an eyepiece to enlarge the image.

Similar situations apply to applications as optical correlators. For optical correlator applications, since human eyes do not usually view the images directly, the appearance of the image is therefore less important than the data content on the SLM. For example, if a setup such as the one of FIG. 17a-b is to be used for optical correlation, the proximity pattern plate may not be needed as long as the four sub-pixels of each composite pixel display the correct "bit-information". Users therefore have two ways of presenting gray scale images for optical correlators. The first way is using the proximity pattern plate (or step-on illumination of patterns) as if human eyes are to see the gray images. The second way is removing the illumination pattern, letting each pixel get the same illumination intensity, but still keeping a pre-defined composite pixel structure (or sub-panel structure) and preserving the "data coding relation" between the composite pixel and its sub-pixels. In this way, the content of "bit-information" of the target image is preserved for optical computing, although not for human eyes.

The techniques also can be applied to increase color/gray capacity of volumetric 3D displays that use, especially but not limited to, binary SLM. When applied to volumetric 3D displays, they are not limited to moving screen types of display. They can also be applied to 2-step excitation types of display, by projecting one of the two beams using the projection techniques disclosed in this invention. In addition, they can be applied to increase the resolution of volumetric 3D display systems in the screen motion direction. They can also be applied to 2D projectors, using a single display panel with color triad structure, to project images without color triad artifacts.

References

Displaytech Inc., of Longmont Colo., product manual

Joubert, C. et al. "Dispersive Holographic Microlens Matrix for Single LCD Projector", in Projection Display II, Ming H. Wu, Editor, Proc. SPIE 2650, p. 243 (1996)

Kim, S. G. and Huang K. H., "Thin-Film Micromirror Array", Information Display 4&5, 1999, p. 30

Morris, G. M. et al. "Diffractive Optics Technology for Projection Display", in Projection Display II, Ming H. Wu, Editor, Proc. SPIE 2650, p. 112 (1996)

Rosenbluth, A. E. and Singh, R. N., "Projection Optics for Reflective Light Valves", Projection Display V, ed. by S. M. Wu, p. 87

Thompson, E. E. and DeMond, T. W. "Apparatus and Method for Image Projection", U.S. Pat. No. 5,506,597

Tsao, C. C., Zhou, Z. and Hu, A. K. J. 1998 "Method and Apparatus for Displaying Three-dimensional Volumetric Images", U.S. Pat. No. 5,754,147, 1998

Tsao, C. C. 1999 "Moving Screen Projection Technique for Volumetric Three-dimensional Display", U.S. Pat. No. 5,954,414, 1999.

All references and additional prior arts are to be submitted in the Information Disclosure Statement.

What is claim is:

1. Method of creating a 2D-image-frame of multiple levels of an optical property using one image frame of a spatial light modulator, for applications in displaying 2D images or one frame of a volumetric 3D images, said optical property comprising a number of basic components, different said basic components being able to be combined to create multiple levels of said optical property; said optical property and said basic components comprising one of the following combinations:
   a. color as said optical property and different primary colors as said basic components; or
   b. brightness as said optical property and different brightness strengths as said basic components, or
   c. polarization as said optical property and different polarization states as said basic components, or
   d. phase as said optical property and different phase states as said basic components; the method including the steps of:
   (1) dividing the pixels of the spatial light modulator into a number of groups and defining each group as a sub-panel;
   (2) creating an illumination pattern by a pattern generation means, the illumination pattern comprising a 2D distribution of different said basic components;
   (3) projecting said illumination pattern onto the spatial light modulator by a projection optics and illuminating each said sub-panel with a light of a different said basic component, thereby each said sub-panel having an illumination beam of a different said basic component, and due to the illumination each said sub-panel also having an output object beam of a different basic component carrying the image of said sub-panel;
   (4) recombining the images of said sub-panels by an image combining means to create said 2D-image-frame, said 2D-image-frame thereby comprising composite pixels as its basic picture elements, each said composite pixels having a number of sub-pixels, each said number of sub-pixels being a pixel belonging to a different said sub-panel.

2. Method of claim 1, wherein
the step of creating the illumination pattern including the steps of:
   (1) creating a basic pattern of light by illuminating a pattern plate with a light source, the basic pattern comprising an area of light or an array of light spots or light stripes;
   (2) projecting said basic pattern by a first lens, and splitting it into multiple paths by a beam splitting means;
   (3) adjusting the optical property of each said path by a modulation means such that each said path has a different said basic component;
the step of projecting the illumination pattern including the step of projecting each said path onto one said sub-panel by a second lens.

3. Method of claim 2, wherein said optical property being color and said basic components being primary colors, said beam splitting means and said modulation means comprising one of the following combinations:
   a. said beam splitting means comprising a set of non-polarizing beam splitters and said modulation means comprising a set of color filters;
   b. said beam splitting means comprising a set of polarizing beam splitters and said modulation means comprising a set of ColorSelect filters;
   c. a set of dichroic color reflectors for both beam splitting and modulation;
thereby each said path having a different primary color.

4. Method of claim 2, wherein said optical property being brightness and said basic components being different brightness strengths, said modulation means comprising a brightness modulation means, such as an aperture stop, the brightness modulation means scaling the strengths of illumination on different said paths to a preset ratio.

5. Method of claim 2, wherein said pattern plate comprising one of the following means:
   a. a shadow mask comprising a transparent plate with reflective patterns on its surface; or b. a shadow mask comprising a transparent plate with reflective patterns on its surface, further comprising a collector means for recovering transmitted or reflected light; or c. an aperture plate with a transparent or reflective area; or d. an array of light re-directing elements such as micro-lens or micro-concave reflectors.

6. Method of claim 2, wherein said spatial light modulator being of reflective type, said image combining means comprising said beam splitting means but operating in reverse directions, said image combining means merging images of said sub-panels into one superimposed frame.

7. Method of claim 1, wherein said optical property being brightness and said basic components being different brightness strengths;

said illumination pattern comprising an array of light elements, such as spots or stripes;

the step of projecting illumination pattern including the step of projecting said illumination pattern onto said spatial light modulator with each said light element covering a number of adjacent pixels such that the averaged illumination intensities on said adjacent pixels are scaled at a preset ratio, each of said adjacent pixels belonging to a different said sub-panel, said preset ratio giving each said sub-panel a different brightness strengths.

8. Method of claim 1, wherein the step of creating the illumination pattern including the step of illuminating a pattern plate with a light source, said pattern plate comprising one of the following means:

a. an array of micro-color filters; or b. an array of micro-polarization elements; or c. an array of transparent cells of different thickness or of different index of refraction; or d. an array of transparent cells containing liquid crystals of different orientations with different phase attenuation effect.

9. Method of claim 1, wherein the step of dividing pixels and defining sub-panels dividing the pixels into a number of interlocked groups on the spatial light modulator, the pixel locations of each group spreading over the spatial light modulator, the pixel locations of different groups being interlocked, defining each of said interlocked groups as a sub-panel;

said image combining means displaying the image of the spatial light modulator in full frame, the images of all said sub-panels combining to present said 2D-image-frame of multiple levels of said optical property as viewed in human eyes.

10. Method of claim 1, wherein said image combining means comprising an optical filter means, the optical filter means differentiating and separating the images of different said sub-panels by their different said basic components, said image combining means also comprising a reflector means, said reflector means recombining and superimposing the images of different sub-panels into one image frame.

11. Method of claim 10, wherein said optical property being color and said basic components being primary colors; said optical filter means comprising a set of dichroic color reflectors, said reflector means comprising the same set of dichroic color reflectors.

12. Method of claim 10, wherein said optical property being brightness and said basic components being different brightness strengths, said spatial light modulator being of micro-mirror type and capable of operating under non-polarized illumination, such as a digital micro-mirror device or a thin-film micro-mirror array;

the step of defining sub-panel defining two sub-panels, s-sub-panel and p- sub-panel;

the step of projecting illumination pattern including the step of polarizing said illumination beams by a polarizing optics and illuminating the p- sub-panel with a p-polarized illumination beam and illuminating the s-sub-panel with a s-polarized illumination beam, also including the step of scaling the illumination intensities of the two beams at a preset ratio by a brightness modulation means;

said optical filter means comprising a polarizing beam splitter for separating the images on the s- sub-panel and on the p- sub-panel, said reflector means comprising a set of reflectors and a TIR prism for redirecting and recombining the images of the two sub-panels.

13. Method of claim 10, wherein said optical property being brightness and said basic components being different brightness strengths, said spatial light modulator being of liquid crystal type, such as a ferroelectric liquid crystal display;

the step of defining sub-panel defining two sub-panels comprising;

the step of projecting illumination pattern including the step of polarizing said illumination beams by a polarizing optics and illuminating one said sub-panel with a p-polarized illumination beam and illuminating the other with a s-polarized illumination beam, also including the step of sealing the illumination intensities of the two beams at a preset ratio by a brightness modulation means;

said optical filter means comprising a polarizing beam splitter for separating s- and p-light from both said sub-panels, said reflector means comprising a set of reflectors and a TIR prism for redirecting and recombining the images of the two sub-panels;

further including the step of displaying on one said sub-panel with image in s-state and background in p-state, displaying on the other sub-panel image in p-state and background in s-state.

14. Method of claim 10, said image combining means further comprising an image projection optics, said image projection optics projecting images of said sub-panels onto a display means and creating said 2D-image-frame.

15. Method of claim 14, further including the step of arranging incidence angles of said illumination beams such that each said object beam enters said image projection optics with minimum light loss.

16. Method of claim 1, wherein the step of recombining the images of sub-panels including the step of arranging the incidence angles of said illumination beams such that said object beams do not intersect each other at a distance after the spatial light modulator; said image combining means comprising a reflector means, said reflector means recombining said object beams and superimposing the images of different sub-panels into one image frame.

17. Method of claim 16, said image combining means further comprising a number of projection lens, each said projection lens corresponding to one said object beam and projecting the image of one said sub-panel to a display means; said reflector means comprising a set of reflectors after said projection lens to redirect the directions of the projected images from different said sub-panels and superimpose and merge them into one image frame on said display means.

18. Method of claim 1, wherein said spatial light modulator being a ferroelectric liquid crystal display, the method further including the step of displaying successive 2D image frames by displaying all-positive frames successively and then displaying the corresponding inverted frames successively, and the step of applying a polarization rotator to correct the inverted frames.

19. Method of creating multiple 2D-image-frames at high frame rate with one image frame of a spatial light modulator, for applications in displaying 2D images or frames of a volumetric 3D image, the method including the steps of:
   (1) dividing the pixels of the spatial light modulator into a number of groups and defining each group as a sub-panel;
   (2) creating a basic pattern of light by illuminating a pattern plate with a light source, the basic pattern comprising an area of light or an array of light spots or light stripes;
   (3) projecting said basic pattern by a projection optics, splitting said basic pattern into multiple paths by a beam splitting means, projecting each said path onto one different said sub-panel;
   (4) modulating each said path by a modulating means and illuminating each said sub-panel sequentially, illuminating only one said sub-panel at a time; further making the total time period of sequentially illuminating each of the defined sub-panels shorter than one frame period of said spatial light modulator;
   (5) recombining the images of said sub-panels by an image combining means, the modulated illumination displaying one sub-panel at a time, wherein each said sub-panel forming one of said multiple 2D-image-frames.

20. Method of claim 19, said beam splitting means or said modulation means further comprising means of adjusting the optical property of each said path such that each said path has a different said basic component.

21. Method of claim 19, wherein said image combining means comprising an image projection optics, said image combining means projecting images of said sub-panels onto a display means and displaying said 2D-image-frames.

22. Method of creating multiple 2D image frames at high frame rate using multiple spatial light modulators, for applications in displaying 2D images or frames of a volumetric 3D image, the method including the steps:
   (1) providing each said spatial light modulator with an illumination source;
   (2) displaying a frame of image on each said spatial light modulator;
   (3) modulating said illumination source by a modulation means and illuminating each said spatial light modulator sequentially, only one at a time; further making the total time period of sequentially illuminating each of said spatial light modulators shorter than one frame period of said spatial light modulators;
   (4) superimposing and displaying the image frames of said spatial light modulators by an image merging means, the modulated illumination displaying one frame from one of said spatial light modulators at a time.

23. Method of claim 22, wherein said image merging means comprising a projection optics and a set of aligning reflectors after said projection optics, said image projection optics projecting images of said spatial light modulators onto a display means for displaying 2D images or volumetric 3D images, said aligning reflectors merging the projected image frames of spatial light modulators to a single location on said display means.

24. Method of creating a 2D-image-frame of multiple grayscale with one image frame of a reflective spatial light modulator, the method including the steps of:
   (1) dividing the pixels of the spatial light modulator into a number of interlocked groups, the pixel locations of each group spreading over the spatial light modulator, the pixel locations of different groups being interlocked, defining each of said interlocked groups as a sub-panel;
   (2) defining composite pixels on the spatial light modulator, each said composite pixel comprising a said number of adjacent pixels of the spatial light modulator, each of said adjacent pixels belonging to one different said sub-panel, defining each of said adjacent pixels of one composite pixel as a sub-pixel of the composite pixel;
   (3) providing a pattern plate covering the active surface of the spatial light modulator in proximity, said pattern plate comprising an array of light redirecting or light masking micro-elements;
   (4) illuminating the spatial light modulator through said pattern plate with an illumination beam, said pattern plate attenuating said illumination beam such that the averaged illumination intensities over said sub-pixels in every said composite pixel being scaled at a preset ratio, each said sub-panel thereby having a reflected beam of a different illumination intensity, said pattern plate further attenuating said reflected beams to produce an output image frame near the surface of said pattern plate, each said composite pixel displaying multiple levels of brightness by different combinations of different illumination intensities of its sub-pixels, said output image frame forming said 21D-image-frame.

25. Method of claim 24, further including the step of projecting said output image frame to a display means for displaying 2D images or volumetric 3D images by a projection lens to display said 2D-image-frame.

26. Method of creating a 2D-image-frame capable of representing data contents of images of multiple colors or grayscales using one frame of a spatial light modulator, for image processing in optical correlator applications, including the steps of:
   (1) dividing the pixels of the spatial light modulator into a number of groups, defining each of said groups as a sub-panel;
   (2) defining composite pixels on the spatial light modulator, each said composite pixel comprising a said number of sub-pixels, each said sub-pixel being a pixel of the spatial light modulator, each of said sub-pixels belonging to one different said sub-panel;
   (3) assigning a different primary color or brightness strength to each said sub-pixel of said composite pixel, said different brightness strengths being scaled at a preset ratio, thereby every composite pixel being able to represent the data contents of multiple and different colors or brightness levels by different combinations of states of its sub-pixels;
   (4) said composite pixel and its sub-pixels forming the basic picture elements of said 2D-image-frame.

* * * * *

UNITED STATES PATENT AND TRADEMARK OFFICE
CERTIFICATE OF CORRECTION

| | | |
|---|---|---|
| PATENT NO. | : 6,961,045 B2 | Page 1 of 2 |
| APPLICATION NO. | : 09/882826 | |
| DATED | : November 1, 2005 | |
| INVENTOR(S) | : Che-Chih Tsao | |

It is certified that error appears in the above-identified patent and that said Letters Patent is hereby corrected as shown below:

1. Col. 3, line 60, change "su-frames" into -- sub-frames --.

2. Col. 4, line 4, change "FIG. 7a" into -- FIG. 8a --.

3. Col. 6, line 20, change "frame, period" into -- frame period --.

4. Col. 8, line 19, change both "display panel"s into -- SLM --.

5. Col. 8, line 57, change "merging optics 780A after" into -- merging optics 780B after --.

6. Col. 18, line 8, in claim 12, insert -- comprising -- between "sub-panel" and "defining".

7. Col. 18, line 29-30, in claim 13, delete "comprising" after "two sub-panels"; then insert -- comprising -- between "sub-panel" and "defining".

8. Col. 18, line 36, in claim 13, change "the step of sealing" into -- the step of scaling --.

9. Col. 18, line 46, in claim 13, change "the other sub-panel image" into -- the other sub-panel with image --.

UNITED STATES PATENT AND TRADEMARK OFFICE
CERTIFICATE OF CORRECTION

PATENT NO. : 6,961,045 B2
APPLICATION NO. : 09/882826
DATED : November 1, 2005
INVENTOR(S) : Che-Chih Tsao It is certified that error appears in the above-identified patent and that said Letters Patent is hereby corrected as shown below:

10. Col. 20, line 38-39, in claim 24, change "21D-image-frame" into

-- 2D-image-frame --.

Signed and Sealed this

Eighteenth Day of December, 2007

JON W. DUDAS
*Director of the United States Patent and Trademark Office*